United States Patent Office 3,493,386
Patented Feb. 3, 1970

3,493,386
PUFFED FIBROUS FOOD PRODUCT AND PROCESS OF PREPARING SAME
Alvan W. Pyne, Wayzata, Minn., assignor to General Mills, Inc., a corporation of Delaware
No Drawing. Filed Nov. 25, 1966, Ser. No. 596,745
Int. Cl. A23j 1/14, 1/20
U.S. Cl. 99—17     15 Claims

ABSTRACT OF THE DISCLOSURE

Puffed fibrous food products are prepared by forming a spinning solution containing both protein and starch, extruding the said spinning solution into an aqueous acid coagulating bath to form fibers, raising the pH of the fibers where necessary to 4.0 to 8.0, drying the fibers to a moisture content of about 8.0 to 35.0% by weight and puffing the dried fibers.

---

The present invention relates to a novel puffed fibrous food product. More particularly, it relates to a process of preparing a puffed food product from fibers derived from a spinning solution containing protein and starch and to the resulting puffed fibrous food product.

A substantial effort has recently been made to produce food products from spun edible protein fibers. All or substantially all of this effort has been in the direction of preparing food products which simulate known natural foods—i.e. meats such as beef, ham, bacon and the like. Simulation of these natural fibrous foods represents an admirable accomplishment. However, it is apparent that the consuming public desires not only the known natural foods but also completely new and different products.

Accordingly, it is an object of the present invention to provide a novel puffed fibrous food product. It is also an object of my invention to provide a novel process of preparing a puffed food product from fibers derived from a spinning solution containing protein and starch. These and other objects will become apparent from the following detailed description.

I have now discovered that a delicious, attractive puffed fibrous food product can be prepared by forming a spinning solution containing both protein and starch, extruding the said spinning solution into an aqueous acid coagulating bath to form fibers, raising the pH of the said fibers where necessary, drying the fibers to a moisture content suitable for puffing and puffing the resulting dried fibers. Additionally, the fibers can be impregnated with binders, colorants, flavoring agents and the like prior to being dried and/or flavoring agent and the like can be added to the puffed food product. The products of this invention have a unique texture and appearance making them especially attractive as snack foods.

The spinning solution is formed by dispersing an edible protein and starch in an aqueous alkaline medium. A wide variety of protein materials which are edible can be used. Representative of such materials are the proteins isolated from soybeans, safflower seeds, corn, peanuts, peas and the like and animal proteins such as casein, etc. It is preferred to use the proteins isolated from oilseeds and it is especially preferred to use isolated soybean protein. The latter material is preferred because of its commercial availability.

A variety of starches can also be employed in the preparation of the spinning solution. Such starches can be in modified or unmodified form. Thus the starch can be pregelatinized, oxidized, cross-linked or the like. In addition, flours containing a high starch content such as corn flour and the like can be used to provide the starch in the spinning solution. It is preferred to employ corn starch or corn flour. And cross-linked corn starch has been found to be especially suitable. One product of this type is COL-FLO 67 available from National Starch and Chemical Corp. This product consists entirely of amylopectin chains cross-linked with acetyl groups. It is easily and quickly dispersed in cold water and, when gelatinized, it is smooth, short-textured and bland and is resistant to breakdown under low pH conditions. Other starches and flours such as wheat starch, wheat flour, tapioca starch, and potato starch may also be used. However, said materials are less preferred because they have characteristics which tend to cause the spinning solution to become too viscous and/or gel and thus the said solution becomes difficult to handle and extrude, especially in continuous operations employing spinnerets yielding fine fibers.

The edible protein is dispersed in the aqueous alkaline medium in varying amounts, such as from 10–35% by weight and preferably 15–25% by weight. The starch is used in an amount of about 5 to 40% by weight based on the amount of the edible protein. Preferably, the starch is employed in an amount of 15 to 25% by weight based on the amount of the said protein. Amounts of starch much below about 5% yield fibers which exhibit little or no puffing. Amounts of starch much above about 40% yield fibers which fail to have satisfactory tensile strength and thus disintegrate on handling. The minimum tensile strength of the fibers should be about 5 inch-lbs.

The aqueous alkaline medium comprises water and an alkali metal hydroxide. It is preferred to use sodium hydroxide at concentrations of about 5 to 10% by weight. The pH of the spinning solution can vary within relatively wide limits but is generally in the range of 9 to 13.5. It is especially preferred that the edible protein and sodium hydroxide are present in the spinning solution in a weight ratio of 10–14 to 1. The temperature of the spinning solution is preferably within the range of about 20–45° C. It is, of course, understood that the pH, temperature and concentrations of the alkali metal hydroxide, the edible protein and the starch will vary somewhat depending on the particular materials employed. Also, the dispersion may amount to a colloidal solution and it is understood that the use of either the term spinning solution or the term spinning dispersion is inclusive of the other.

After formation of the spinning dispersion, it is forced through an extrusion device—i.e. a spinneret as used in the production of rayon—into an acid coagulating bath. The streamlets coming through the spinneret are thus precipitated in the form of filaments or fibers. The filaments issuing from the said spinneret, which is actually a die having from about 1,000 to 20,000 (and preferably 5,000 to 18,000) holes each on the order of 0.002–0.006 (preferably 0.003–0.005) inch in diameter will be of a diameter of about 0.002–0.006 (preferably 0.003–0.005) inch. It is also possible to have a series of spinnerets producing filaments from the spinning solution. Such spinnerets may have the same or different number of holes of the same or different diameter making it possible to directly produce tows of fibers having varying sizes and characteristics.

The coagulating bath is an aqueous solution of an acid which also preferably contains a salt. The salt (i.e., NaCl, for example) can be used in widely varying concentrations such as, for instance, about 0.5 to 12% by weight. The acid can be any of those normally used in the coagulation of proteins from their aqueous alkaline solutions. Representative acidic compounds are acetic acid, lactic acid, citric acid, phosphoric acid, adipic acid, sulfurous acid, hydrochloric acid and the like. The concentration of the said acid in the bath must be sufficient to coagulate the protein in the filaments issuing from the spinneret. This depends somewhat on the isoelectric point of the particular protein used in the formation of spinning solution. Generally, the acid will be used in a concentration sufficient to maintain the pH of the coagulating bath below about 6.5 and preferably below about 4.0. Of course, the weight percent of the acids varies considerably because of their relative strengths. Preferably, however, the acids will be present in an amount of about 0.5 to 10% by weight. One or more coagulating baths may be used and the concentration of acid and salt and the temperatures of such baths may vary (temperatures are normally in the range of about 30 to 90° C.).

The spinning dispersion and fibers can be prepared batchwise or in a continuous manner. Thus an aqueous slurry of the edible protein, the aqueous alkaline medium and an aqueous slurry of the starch can be individually and continuously charged into a mixing device, the alkaline medium and the two slurries can then be continuously intimately blended while being advanced to the discharge orifice of the mixing device and then the resulting spinning solution can be continuously extruded through an extrusion device, i.e. a spinneret, into the acid coagulating bath. Of course, in such a continuous process an aqueous slurry containing both the protein and starch can be introduced into the mixing device. The said mixing device is preferably a screw pump having mixing and metering sections. Such continuous method is further described with regard to the spinning of solutions or dopes consisting of protein in R. W. Westeen et al. Patent 3,118,959 which disclosure si incorporated herein by reference.

The filaments or bundles thereof (tows) are preferably stretched by pulling them from the coagulating bath or baths over a take-away reel(s). Preferably, stretching tensions of about 50 to 400% are applied to the filaments or fibers. It is understood, however, that higher or lower tensions can be used and also that the stretching can be performed on a series of reels each with an increasing rate of speed or an increased stretching tension. It is further understood that the stretching of the filaments or fibers can take place in the acid coagulating bath, after emergence thereof from the said bath, or partly in the bath and partly after emergence from the bath.

The pH of the filaments or bundles thereof leaving the acid coagulating bath varies considerably depending on the particular acid employed, the concentration thereof, the amount of acid consumed (if not continuously replenished) and the alkalinity of the spinning dispersion. Under many optimum coagulating or precipitating conditions, the pH of the fibers will be below about 4.0, i.e. in the range of 1.0 to 3.5. I have found that fibers derived from the protein and starch containing spinning solutions will not puff to any appreciable degree unless the pH of the said fibers is 4.0 or above. The pH cannot be much above 7.0–8.0 or the protein will be solubilized and the fibers will disintegrate on handling. Preferably, the pH of the fibers is in the range of 4.5 to 6.5 prior to the puffing step. Accordingly, where the pH of the fibers is below 4.0 upon leaving the acid coagulating bath, the fibers are water washed or passed through an aqueous neutralizing bath in order to raise the pH to the necessary degree. The neutralizing bath is preferably an aqueous solution of an alkali metal hydroxide or basic salt such as an alkali metal carbonate or bicarbonate—i.e. sodium bicarbonate. It is understood that the terms "neutralizing" and "neutralization" include any method of raising the pH of the fibers to the necessary level.

The fibers having the requisite pH upon leaving the acid coagulating bath or after having had the pH thereof raised to the necessary level have a high moisture content—i.e. 85% or above. Such fibers could be directly dried. However, it is preferred to remove a portion of the moisture content prior to the drying operation or other processing. Thus the fibers can be passed through squeeze rolls to reduce the moisture level to about 60–80% by weight. The reduced moisture content fibers are more easily handled during the subsequent drying and/or impregnating and drying steps.

The fibers can be dried by any conventional dehydration procedure—i.e. vacuum drying, warm air drying, and the like. The extent to which the fibers are dried depends on the ultimate method of puffing same. Thus where the fibers are to be puffed by deep fat frying, the moisture content thereof is preferably in the range of about 8 to 16%. Where the fibers are to be puffed by exposure to hot air, the moisture content is preferably in the range of about 20–35% by weight.

In one preferred embodiment, the fibers having a pH of between 4.0 and 8.0, preferably 4.5 to 6.5, are simply dried to the requisite moisture content and puffed to yield the novel food product of the present invention. In this embodiment, coloring agents such as dyes can be added to all or a portion of a bundle of fibers, preferably before the drying step. And flavoring agents, such as salt (NaCl), onion powder, garlic powder and the like, may be added to the puffed fibrous food product.

In a second preferred embodiment, the fibers prior to being dehydrated are impregnated with an edible serum. Such serum can include a binder, flavoring agents, coloring agents and the like. Such latter materials include various spices and salts, imitation meat flavors, vegetable flavors, dyes, pigments, emulsifiers and the like. The binder, when used, is a heat coagulable protein material such as albumen. After impregnation with the serum, and especially where the serum includes a heat coagulable protein binder, the fibers are preferably heated to yield a firmer or at least partially set up product. The impregnated product is then dried to the requisite moisture content as set forth hereinabove and puffed.

The dehydrated products containing from about 8 to 35% moisture can be puffed by a variety of methods. One preferred method is deep fat frying at temperatures of at least 350° F. and preferably at least 375° F. to 400° F. for from about 5 to 45 seconds. In such method the fibers alone or the fibers impregnated with serum have a moisture content of at least 7% by weight and preferably from about 8 to 16% by weight. In another preferred method dried fibers alone or the fibers impregnated with serum having a moisture content of about 20 to 35% by weight are puffed by suddenly subjecting same to hot air of a temperature of about 325° F. to 375° F. for about 10 to 120 seconds. Whatever method of puffing is used, it is preferred that the fibers are cut into lengths of 1 to 4 inches, either prior to or after the dehydration thereof and before the puffing step. Also, in order to obtain optimum puffing it is desirable that the fibers in the bundles are aligned. Thus prior to being dried, the fibers, whether impregnated or not, are preferably maintained in a discrete linear arrangement. Excessive matting of the fibers tends to inhibit puffing.

The following specific examples are furnished for the purpose of illustration only and are not to be construed as placing any limitations on the scope of the present invention.

EXAMPLE I

Into a mixing device of the type described in the above-identified Westeen et al. patent were continuously pumped aqueous slurries of isolated soy protein (24% solids—190 g./min.) and cross-linked amylopectin starch (COL-FLO 67—12.6% solids—72 g./min.) and a 10% by weight aqueous solution of sodium hydroxide (32 ml./min.). The alkaline medium and the slurries were intimately blended while being advanced to the discharge orifice of the mixing device. The resulting spinning solution contained about 15.5% by weight isolated soy protein and 20% by weight starch based on the amount of isolated soy protein. The NaOH was used in an amount such that the ratio of protein to the said NaOH was 12.8 to 1, respectively. The spinning solution was discharged into a line containing a filter and a metering pump. It was pumped to the extrusion device containing a spinneret having 15,975 holes (diameter of 0.004 in.) immersed in an acid coagulating bath (10.0% by weight NaCl, 1.8% glacial acetic acid, 88.2% water). The average time between the first contact of the protein and starch slurries and the alkaline solution and the extrusion of the resulting spinning solution through the spinneret was about 3 minutes. There was obtained a continuous tow of protein and starch containing filaments having a pH of about 3.4–3.5. The pH was raised to about 5.0 by immersing the fiber tow in an aqueous solution of NaHCO₃ (1–2% by weight). The fibers were also stretched about 200–300% by pulling the same out of the acid coagulating and neutralizing baths over take-away reels. The moisture content of the fibers was reduced to 67–70% by squeezing. The fiber tow was then cut into sections having lengths of about 2 inches and dried in an oven at 140° F. for 4 hours to a moisture content of 15%. The sections of the fiber tow were then deep fat fried in coconut oil at 375° F. for 5 seconds to yield an attractive puffed fibrous product. There was marked puffing (about 200% increase in width, 150% increase in length) with some curling of the sections.

EXAMPLE II

Example I was repeated except that the pH of the fibers was raised to only 3.8 by water washing. Upon deep fat frying, the fiber tow sections did not puff to any appreciable extent. Instead, blistering and small bubbles were obtained and there were some vitrified areas in the fiber tow sections.

EXAMPLE III

Example I was repeated except that the fiber pH of the fiber tow was raised to 4.6 with the NaHCO₃ solution and the fiber tow sections were dried to a moisture content of 10.8%. The sections puffed as in Example I but the puffed pieces were more evenly opaque white.

EXAMPE IV

Example I was repeated except that the fiber tow was impregnated with an aqueous solution of dye (1% of FD & C Red #2) prior to being dried. The resulting puffed fibrous product was uniformly colored with the dye, the puffed areas being somewhat lighter in color.

EXAMPLE V

Example I was repeated except the fiber tow sections were dried to an average moisture content of 24–29% and were puffed by sudden exposure to hot air (350° F.) for two minutes. The resulting puffed fibrous food product had substantially the same properties as the product of Example I.

EXAMPLE VI

Example I was essentially repeated using a 10% NaOH solution (7 g./min.) and a corn flour-isolated soy protein slurry (50 g./min.). The slurry was made up from 25 lbs. of an isolated soy protein slurry (18.9% solids), 0.95 lbs. corn flour and 5.56 lbs. water. The isolated soy protein/caustic ratio in the resulting spinning solution was 10.7 to 1, respectively, and the corn flour was present in an amount of 20% by weight based on the amount of isolated soy protein. The spinning solution was extruded as in Example I through a spinneret having 5000 holes (diameter 0.005 in.). The pH of the resulting fibers was raised to 7.6 using the NaHCO₃ neutralizing solution. The oven dried fibers (8–10% moisture) puffed markedly on deep fat frying in coconut oil at 375° F. for 10–15 seconds. The puffed fibrous food product was very attractive and palatable, especially when salt was sprinkled on the surface thereof.

EXAMPLE VII

Example VI was repeated except that the pH (about 2.3) of the acid fibers was not raised by using the NaHCO₃ neutralizing solution. No puffing of the dried fibers was obtained when the same were deep fat fried.

It is to be understood that the invention is not to be limited to the exact details of operation or the composition and methods shown and described, as obvious modifications will be apparent to those skilled in the art and the invention is to be limited only by the scope of the appended claims.

The embodiments of the invention in which an exclusive property or privilege is claimed are defined as follows:

1. A process of preparing a puffed fibrous food product comprising: (1) dispersing about 10 to 35% by weight of an edible protein and about 5 to 40% by weight of starch or flour containing a high starch content based on the amount of the edible protein in an aqueous solution of an alkali metal hydroxide to yield a spinning solution having a pH in the range of 9 to 13.5; (2) extruding the spinning solution through a spinneret into an aqueous acid coagulating bath to form fibers; (3) raising the pH of said fibers where necessary to 4.0 to 8.0; (4) drying the fibers to a moisture content of about 8.0 to 35.0% by weight; and (5) puffing the dried fibers to yield the puffed fibrous food product.

2. The process of claim 1 wherein the edible protein is isolated soybean protein.

3. The process of claim 1 wherein the starch is corn starch.

4. The process of claim 3 wherein the corn starch is acetyl cross-linked amylopectin.

5. The process of claim 1 wherein the flour is corn flour.

6. The process of claim 1 wherein the alkali metal hydroxide is sodium hydroxide.

7. The process of claim 1 wherein about 15 to 25% by weight of the edible protein and about 15 to 25% by weight of the starch or flour containing a high starch content based on the amount of the edible protein are dispersed in the aqueous solution of the alkali metal hydroxide, the weight ratio of protein to alkali metal hydroxide being in the range of about 10–14 to 1.

8. The process of claim 1 wherein the spinneret has about 1,000 to 20,000 holes, said holes having a diameter of about 0.002–0.006 inch each.

9. The process of claim 1 wherein the pH of the fiber leaving the aqueous acid coagulating bath is raised by immersion of same in an aqueous solution of a base.

10. The process of claim 9 wherein the base is sodium bicarbonate.

11. The process of claim 1 wherein the fibers are impregated with an edible serum prior to being dried.

12. The process of claim 1 wherein the fibers are dried to a moisture content of about 8 to 16% by weight and puffed by deep fat frying at temperatures of 350° F. to 400° F.

13. The process of claim 1 wherein the fibers are dried to a moisture content of 20 to 35% by weight and puffed by sudden exposure to air heated to about 325 to 375° F.

14. A process of preparing a puffed fibrous food product comprising: (1) dispersing about 15 to 25% by weight of isolated soybean protein and about 15 to 25% acetyl cross-linked amylopectin corn starch based on the amount of soybean protein in an aqueous solution of sodium hydroxide to yield a spinning solution having a pH in the range of 9 to 13.5; (2) extruding the spinning solution through a spinneret into an aqueous acid coagulating bath to form fibers; (3) raising the pH of said fibers to 4.5 to 6.5; (4) drying the fibers to a moisture content of about 8.0 to 16% by weight; and (5) puffing the dried fibers by deep fat frying at temperatures of 350° F. to 400° F. to yield the puffed fibrous food product.

15. The puffed fibrous food product produced by the process of claim 1.

References Cited

UNITED STATES PATENTS

| 2,952,543 | 9/1960 | Szczesniak et al. | 94—14 |
| 3,093,483 | 6/1963 | Ishler et al. | 99—14 XR |
| 3,177,079 | 4/1965 | Kuramoto et al. | 99—17 |
| 3,259,503 | 7/1966 | Tan et al. | 99—81 XR |

FOREIGN PATENTS

| 669,692 | 11/1953 | Great Britain. |
| 1,049,848 | 11/1966 | Great Britain. |

MAURICE W. GREENSTEIN, Primary Examiner
H. H. KLARE, Assistant Examiner

U.S. Cl. X.R.

99—14, 81